US012706689B2

(12) United States Patent
Tsai

(10) Patent No.: US 12,706,689 B2
(45) Date of Patent: Aug. 11, 2026

(54) METHOD AND APPARATUS FOR TRANSPORT BLOCK RETRANSMISSION IN MOBILE COMMUNICATIONS

(71) Applicant: MediaTek Inc., Hsinchu City (TW)

(72) Inventor: Lung-Sheng Tsai, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 312 days.

(21) Appl. No.: 18/636,263

(22) Filed: Apr. 16, 2024

(65) Prior Publication Data

US 2024/0413927 A1 Dec. 12, 2024

Related U.S. Application Data

(60) Provisional application No. 63/506,389, filed on Jun. 6, 2023.

(51) Int. Cl.
*H04L 1/00* (2006.01)
*H04L 1/08* (2006.01)

(52) U.S. Cl.
CPC .......... *H04L 1/0041* (2013.01); *H04L 1/0061* (2013.01); *H04L 1/08* (2013.01)

(58) Field of Classification Search
CPC ........ H04L 1/0041; H04L 1/0061; H04L 1/08
See application file for complete search history.

(56) References Cited

U.S. PATENT DOCUMENTS

2021/0376979 A1* 12/2021 Luo .................... H04W 28/065
2024/0129926 A1* 4/2024 Elshafie ................ H04L 1/0031
2024/0260035 A1* 8/2024 Lee ...................... H04L 1/1896

FOREIGN PATENT DOCUMENTS

WO WO-2023071728 A1 * 5/2023 ............ H04W 28/18

* cited by examiner

*Primary Examiner* — Melvin C Marcelo
(74) *Attorney, Agent, or Firm* — Andy M. Han; Han IP PLLC

(57) ABSTRACT

Various solutions for improving transport block (TB) retransmission with respect to an apparatus in mobile communications are described. The apparatus may transmit a first set of encoded bits corresponding to a first TB via a first physical downlink share channel (PDSCH) to a user equipment (UE). The apparatus may generate a second set of encoded bits corresponding to the first TB and a third set of encoded bits corresponding to a second TB. The apparatus may transmit the second set of encoded bits and the third set of encoded bits via a second PDSCH to the UE.

20 Claims, 5 Drawing Sheets

TRANSMIT, BY A PROCESSOR OF AN APPARATUS, A FIRST SET OF ENCODED BITS CORRESPONDING TO A FIRST TB VIA A FIRST PDSCH TO A UE
510

GENERATE, BY THE PROCESSOR, A SECOND SET OF ENCODED BITS CORRESPONDING TO THE FIRST TB AND A THIRD SET OF ENCODED BITS CORRESPONDING TO A SECOND TB
520

TRANSMIT, BY THE PROCESSOR, THE SECOND SET OF ENCODED BITS CORRESPONDING TO THE FIRST TB AND THE THIRD SET OF ENCODED BITS CORRESPONDING TO THE SECOND TB VIA A SECOND PDSCH TO THE UE
530

FIG. 5

RECEIVE, BY A PROCESSOR OF AN APPARATUS, A FIRST SET OF ENCODED BITS CORRESPONDING TO A FIRST TB VIA A FIRST PDSCH FROM A NETWORK NODE
610

TRANSMIT, BY THE PROCESSOR, A NACK CORRESPONDING TO THE FIRST TB TO THE NETWORK NODE
620

RECEIVE, BY THE PROCESSOR, A SECOND SET OF ENCODED BITS CORRESPONDING TO THE FIRST TB AND A THIRD SET OF ENCODED BITS CORRESPONDING TO A SECOND TB VIA A SECOND PDSCH FROM THE NETWORK NODE
630

FIG. 6

METHOD AND APPARATUS FOR TRANSPORT BLOCK RETRANSMISSION IN MOBILE COMMUNICATIONS

CROSS REFERENCE TO RELATED PATENT APPLICATION(S)

The present disclosure is part of a non-provisional application claiming the priority benefit of U.S. Patent Application No. 63/506,389, filed on 6 Jun. 2023, the content of which herein being incorporated by reference in its entirety.

TECHNICAL FIELD

The present disclosure is generally related to mobile communications and, more particularly, to transport block retransmission with respect to apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR) network, a base station may transmit a transport block (TB) to a user equipment (UE) via a physical downlink share channel (PDSCH). The TB includes payload bits. In some cases, the user equipment may not successfully decode the TB, and then the user equipment may report a negative acknowledgement (NACK) to the base station so that the base station can retransmit the TB to the user equipment via the PDSCH. However, retransmission of a whole TB may be inefficient and resource-consumed.

Accordingly, how to perform retransmissions in an effective way becomes an important issue in the newly developed wireless communication network. Therefore, there is a need to provide proper schemes to perform transport block retransmission.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that improving transport block (TB) retransmission with respect to apparatus in mobile communications.

In one aspect, a method may involve an apparatus transmitting a first set of encoded bits corresponding to a first TB via a first physical downlink share channel (PDSCH) to a UE. The method may also involve the apparatus generating a second set of encoded bits corresponding to the first TB and a third set of encoded bits corresponding to a second TB. The method may further involve the apparatus transmitting the second set of encoded bits and the third set of encoded bits via a second PDSCH to the UE.

In one aspect, a method may involve an apparatus receiving a first set of encoded bits corresponding to a first TB via a first PDSCH from a network node. The method may also involve the apparatus transmitting a negative acknowledgment (NACK) corresponding to the first TB to the network node. The method may further involve the apparatus receiving a second set of encoded bits corresponding to the first TB and a third set of encoded bits corresponding to the second TB via a second PDSCH from the network node.

In one aspect, an apparatus may comprise a transceiver which, during operation, wirelessly communicates with at least one UE of a wireless network. The apparatus may also comprise a processor communicatively coupled to the transceiver. The processor, during operation, may perform operations comprising transmitting, by the transceiver, a first set of encoded bits corresponding to a first TB via a first PDSCH to the UE. The processor may also perform operations comprising generating a second set of encoded bits corresponding to the first TB and a third set of encoded bits corresponding to a second TB. The processor may further perform operations comprising transmitting, by the transceiver, the second set of encoded bits and the third set of encoded bits via a second PDSCH to the UE.

In one aspect, an apparatus may comprise a transceiver which, during operation, wirelessly communicates with at least one network node of a wireless network. The apparatus may also comprise a processor communicatively coupled to the transceiver. The processor, during operation, may perform operations comprising receiving, by the transceiver, a first set of encoded bits corresponding to a first TB via a first PDSCH from the network node. The processor may also perform operations comprising transmitting, by the transceiver, a NACK corresponding to the first TB to the network node. The processor may further perform operations comprising receiving, by the transceiver, a second set of encoded bits corresponding to the first TB and a third set of encoded bits corresponding to the second TB via a second PDSCH from the network node.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 5 is a flowchart of an example process in accordance with an implementation of the present disclosure.

FIG. 6 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to improvement of transport block (TB) retransmission with respect to apparatus in mobile communications. According to the present disclosure, a number of possible solutions may be implemented separately or jointly. That is, although these possible solutions may be described below separately, two or more of these possible solutions may be implemented in one combination or another.

Regarding to TB retransmission of the present disclosure, a network apparatus transmits a first set of encoded bits corresponding to a first TB to a user equipment (UE) via a first physical downlink share channel (PDSCH). The UE may not decode the first set of encoded bits successfully. Then the UE transmits a NACK to the network apparatus. After receiving the NACK, the network apparatus generates a second set of encoded bits corresponding to the first TB and a third set of encoded bits corresponding to a second TB, and transmits the second set of encoded bits and the third set of encoded bits via a second PDSCH to the UE.

Figures 1, 2:
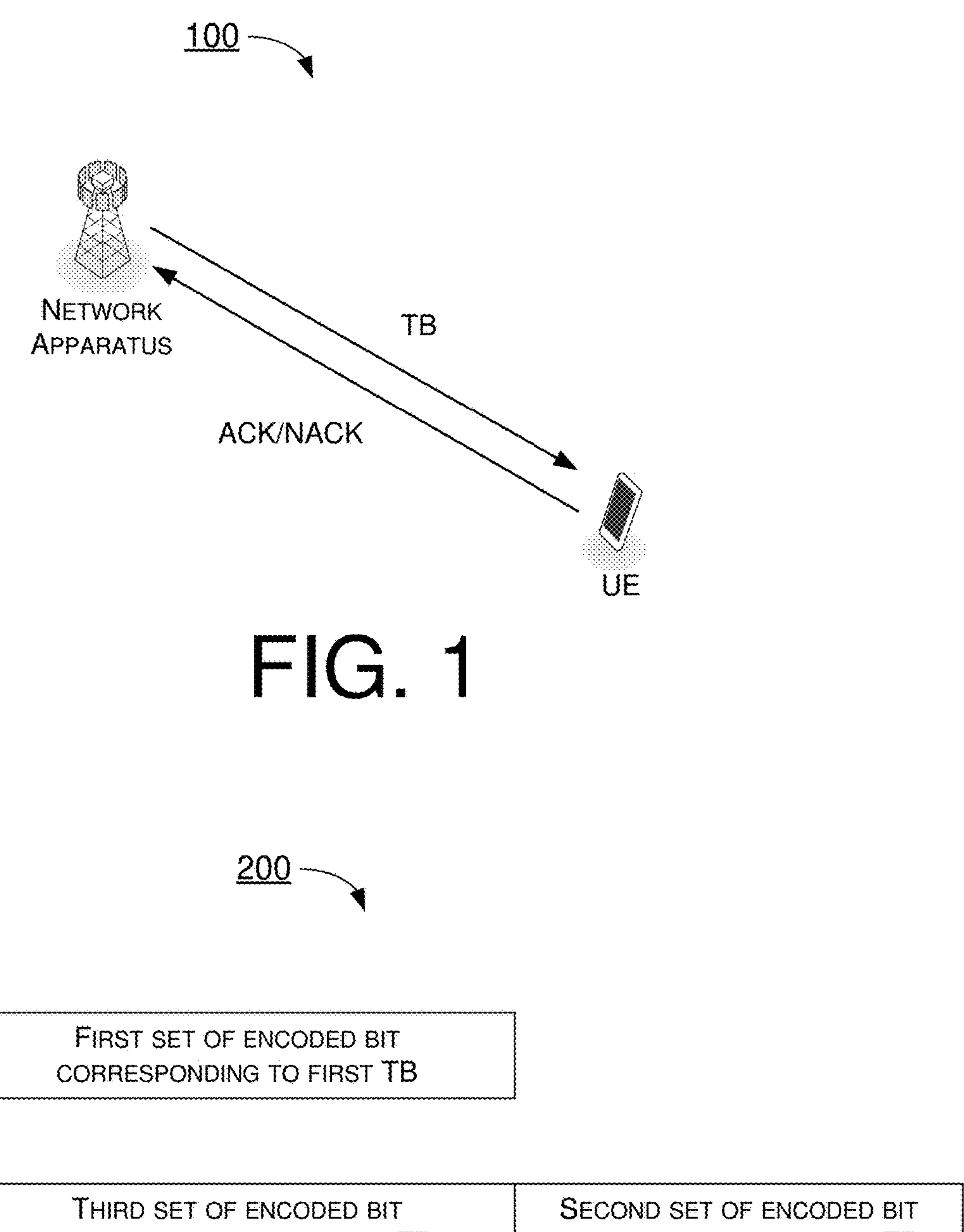
FIG. 1 is a diagram depicting an example scenario under schemes in accordance with implementations of the present disclosure.
FIG. 2 is a diagram depicting an example scenario under schemes in accordance with implementations of the present disclosure.

FIG. 1 illustrates an example scenario 100 under schemes in accordance with implementations of the present disclosure. Scenario 100 involves a network apparatus and a UE, which may be a part of a wireless communication network (e.g., an LTE network, a 5G/NR network, an IoT network or a 6G network). Scenario 100 illustrates the current network framework. The UE may connect to the network side. The network side may comprise one or more than one network apparatus. The network apparatus may transmit a set of encoded bits corresponding to a TB to the UE via the PDSCH. The UE may transmit ACK to the network apparatus if the set of encoded bits corresponding to the TB is successfully decoded. The UE may transmit NACK to the network apparatus if the set of encoded bits corresponding to the TB is not successfully decoded.

FIG. 2 illustrates an example scenario 200 under schemes in accordance with implementations of the present disclosure. The network apparatus may transmit a first set of encoded bits corresponding to a first TB to the UE via a first PDSCH. After receiving the first set of encoded bits corresponding to the first TB, the UE may not successfully decode the first set of encoded bits corresponding to the first TB. Then, the UE may transmit a NACK corresponding to the first set of encoded bits corresponding to the first TB to the network apparatus.

After receiving the NACK, the network apparatus may determine a second set of encoded bits corresponding to the first TB to be retransmitted. Then the network apparatus generates the second set of encoded bits corresponding to the first TB and a third set of encoded bits corresponding to a second TB (i.e., the network apparatus may determine at least part of the first TB to be retransmitted and piggyback the at least part of the first TB with the second TB.)

In some implementations, the UE may transmit an indicator indicating a quality gap between a reference quality and a quality of receiving the first PDSCH to the network apparatus. In particular, when the UE does not successfully decode the first TB, the UE may estimate a quality gap (e.g., channel quality indicator gap (CQI-gap) or signal noise ratio gap (SNR-gap)) between a reference quality and a quality of receiving the first PDSCH. Then, the UE transmit the quality gap with the NACK to the network apparatus. Then, the network apparatus may determine the second set of encoded bits (i.e., the bits need to be retransmitted) according to the gap. For example, if the first PDSCH is scheduled with $MCS_{ref}$ (a reference index of modulation coding scheme) which is supposed to be decodable when received SINR (signal to interference noise ratio) is above $SINR_{ref}$ (signal to interference noise ratio reference) and the UE observes the received SINR during the PDSCH decoding is $SINR_{true}<SINR_{ref}$, the UE may then report some information describing the gap between $SINR_{true}$ and $SINR_{ref}$.

Then, the network apparatus may transmit the second set of encoded bits corresponding to the first TB and the third set of encoded bits corresponding to the second TB via a second PDSCH to the UE. Accordingly, because the second set of encoded bits corresponding to the first TB may be transmitted with the third set of encoded bits corresponding to the second TB via the second PDSCH, the second set of encoded bits corresponding to the first TB may not need to be transmitted via additional PDSCH, which means the additional PDSCH and a corresponding physical downlink control channel (PDCCH) may be saved so as to retransmit the second set of encoded bits corresponding to the first TB more efficiently and less resource consumed.

Figure 3:
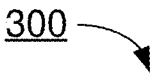
FIG. 3 is a diagram depicting an example scenario under schemes in accordance with implementations of the present disclosure.
Figure 3:
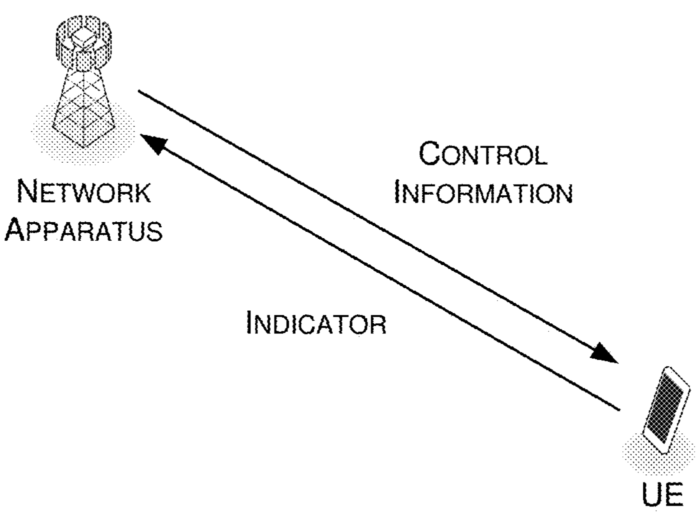

FIG. 3 illustrates an example scenario 300 under schemes in accordance with implementations of the present disclosure. In some embodiments, the network apparatus may transmit a control information to the UE. The control information may indicate to the UE whether a function of associating a previous TB to be retransmitted with a current TB is enabled. Accordingly, in the above-mentioned embodiments, based on the control information, the UE may be indicated that the third set of encoded bits corresponding to the second TB is generated and transmitted with the second set of encoded bits corresponding to the first TB.

In some embodiments, the control information may indicate to the UE that the second set of encoded bits corresponding to the first TB and the third set of encoded bits corresponding to the second TB are multiplexed in a time-frequency domain, which means that the second set of encoded bits corresponding to the first TB and the third set of encoded bits corresponding to the second TB may be carried by non-overlapping time-frequency resources.

In some cases, the control information may indicate to the UE: (1) a plurality of first physical resource blocks (PRBs) associated with the second set of encoded bits corresponding to the first TB; and (2) a plurality of second PRBs associated with the third set of encoded bits corresponding to the second TB. For example, the control information includes a value denoting a number of PRBs allocated to the third set of encoded bits corresponding to the second TB so that the rest of PRBs are allocated to the second set of encoded bits corresponding to the first TB. In some cases, the control information may indicate to the UE: (1) a first redundancy version associated with the second set of encoded bits corresponding to the first TB; and (2) a second redundancy version associated with the third set of encoded bits corresponding to the second TB so that the UE may determine: (1) resources for the second set of encoded bits corresponding to the first TB according to the first redundancy version; and (2) resources for the third set of encoded bits corresponding to the second TB according to the second redundancy version.

In some embodiments, the control information may indicate to the UE that the second set of encoded bits corresponding to the first TB and the third set of encoded bits corresponding to the second TB are multiplexed in a spatial domain, which means that the second set of encoded bits corresponding to the first TB and the third set of encoded bits corresponding to the second TB may be carried by fully overlapped time-frequency resources but using different spatial resources (e.g., using different antennas or transmitting precoder.) In some cases, the control information may indicate to the UE: (1) at least one first spatial layer associated with the second set of encoded bits corresponding to the first TB; and (2) at least one second spatial layer associated with the third set of encoded bits corresponding to the second TB so that the UE may: (1) receive the second set of encoded bits corresponding to the first TB according to the at least one first spatial layer; and (2) receive the third set of encoded bits corresponding to the second TB according to the at least one second spatial layer.

In some embodiments, depending on the different scenarios, the control information may be included in a downlink control information (DCI) or a radio resource control (RRC) message.

In some embodiments, because the second TB is corresponding to whole new information, the third set of encoded bits are generated based on the second TB with cyclic redundancy check (CRC) code. The UE utilizes the CRC to check if the second TB is successfully decoded after its decoding processes. In contrast, because the second set of encoded bits corresponding to the first TB are not expected to be self-decodable, the second set of encoded bits corresponding to the first TB may be generated without CRC code.

In some embodiments, a modulation order used for the second set of encoded bits corresponding to the first TB may be signaled by the network apparatus or may follow modulation order used for the third set of encoded bits corresponding to the second TB.

Illustrative Implementations

Figure 4:
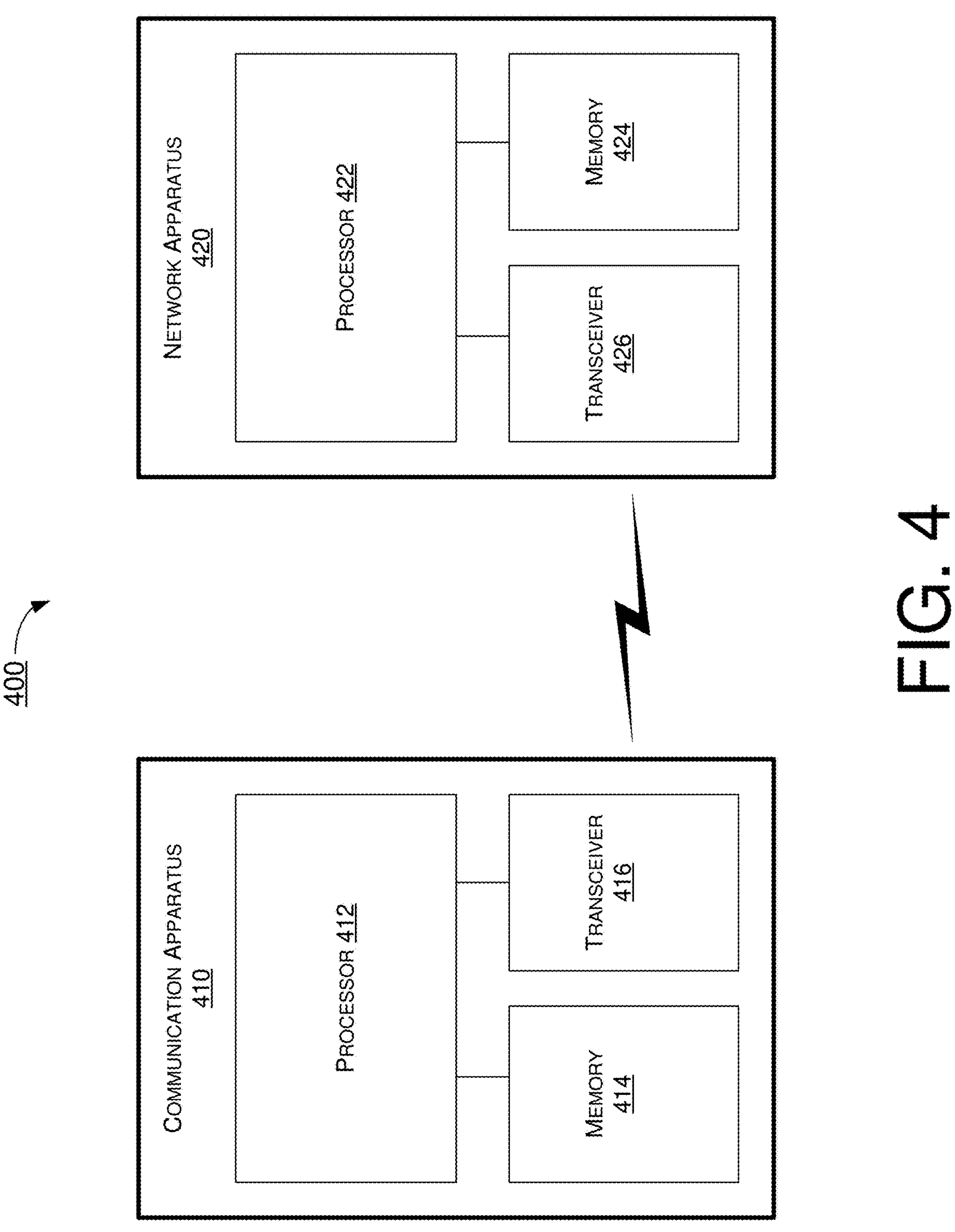
FIG. 4 is a block diagram of an example communication system in accordance with an implementation of the present disclosure.

FIG. 4 illustrates an example communication system 400 having an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to improvement of TB retransmission with respect to user equipment and network apparatus in mobile communications, including scenarios/schemes described above as well as process 500 and process 600 described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 410 may include at least some of those components shown in FIG. 4 such as a processor 412, for example. Communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of a network apparatus, which may be a network node such as a satellite, a base station, a small cell, a router or a gateway. For instance, network apparatus 420 may be implemented in an eNodeB in an LTE network, in a gNB in a 5G/NR, IoT, NB-IoT or IIoT network or in a satellite or base station in a 6G network. Alternatively, network apparatus 420 may be implemented in the form of one or more IC chips such as, for example and without limitation, one or more single-core processors, one or more multi-core processors, or one or more RISC or CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term “a processor” is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including autonomous reliability enhancements in a device (e.g., as represented by communication apparatus 410) and a network (e.g., as represented by network apparatus 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE and network apparatus 420 is implemented in or as a network node of a communication network.

In some implementations, processor 422 may transmit, by the transceiver 426, a first set of encoded bits corresponding to a first TB via a first PDSCH to communication apparatus 410. Processor 422 may a second set of encoded bits corresponding to the first TB and a third set of encoded bits corresponding to a second TB. Processor 422 may transmit, by the transceiver 426, the second set of encoded bits and the third set of encoded bits via a second PDSCH to communication apparatus 410.

In some implementations, the second set of encoded bits is generated based on the first TB without cyclic redundancy check (CRC) code, and the third set of encoded bits is generated based on the second TB with CRC code derived from the second TB.

In some implementations, processor 422 may transmit, by the transceiver 426, a control information to communication apparatus 410. The control information indicates to communication apparatus 410 that the second TB and the first TB are carried by the second PDSCH.

In some implementations, the control information indicates to the communication apparatus 410 that the first TB and the second TB are multiplexed in time-frequency domain.

In some implementations, the control information indicates to the communication apparatus 410 a plurality of first PRBs associated with the first TB and a plurality of second PRBs associated with the second TB.

In some implementations, the control information includes a value denoting a number of PRBs allocated to the second TB.

In some implementations, the control information indicates to the communication apparatus 410 the control information further indicates a first redundancy version associated with the first TB and a second redundancy version associated with the second TB to generate the first set of encoded bits and the second set of encoded bits.

In some implementations, the control information indicates to the communication apparatus 410 that the first TB and the second TB are multiplexed in spatial domain within time-frequency resources allocated to the second PDSCH.

In some implementations, the control information indicates to the communication apparatus 410 at least one first spatial layer associated with the first TB and at least one second spatial layer associated with the second TB.

In some implementations, the control information is included in a DCI or an RRC message.

In some implementations, processor 412 may receive, by the transceiver 416, a first set of encoded bits corresponding to first TB via a first PDSCH from network apparatus 420. Processor 412 may transmit, by the transceiver 416, a NACK corresponding to the first TB to the network apparatus 420. Processor 412 may receive, by the transceiver 416, a second set of encoded bits corresponding to the first TB and a third set of encoded bits corresponding to a second TB via a second PDSCH from the network apparatus 420.

In some implementations, processor 412 may receive, by the transceiver 416, a control information from the network apparatus 420. The control information indicates to the network apparatus 420 that the first TB and the second TB are multiplexed in a time-frequency domain or in a spatial domain, within time-frequency resources allocated to the second PDSCH.

In some implementations, the control information indicates to the network apparatus 420 a plurality of first PRBs associated with the first TB and a plurality of second PRBs associated with the second TB.

In some implementations, the control information includes a value denoting a number of PRBs allocated to the second TB.

In some implementations, the control information indicates to the network apparatus 420 a first redundancy version associated with the first TB and a second redundancy version associated with the second TB.

In some implementations, the control information indicates to the network apparatus 420 that the first TB and the second TB are multiplexed in spatial domain.

In some implementations, the control information indicates to the network apparatus 420 at least one first spatial layer associated with the second set of encoded bits corresponding to the first TB and at least one second spatial layer associated with the third set of encoded bits corresponding to the second TB.

In some implementations, the control information is included in a DCI or an RRC message.

In some implementations, the third set of encoded bits are generated according to the second TB transmitted with cyclic redundancy check (CRC) code and the second set of encoded bits are generated according to the first TB transmitted without CRC code.

Illustrative Processes

FIG. 5 illustrates an example process 500 in accordance with an implementation of the present disclosure. Process 500 may be an example implementation of above scenarios/schemes, whether partially or completely, with respect to improvement of TB retransmission of the present disclosure. Process 500 may represent an aspect of implementation of features of network apparatus 420. Process 500 may include one or more operations, actions, or functions as illustrated by one or more of blocks 510 to 530. Although illustrated as discrete blocks, various blocks of process 500 may be divided into additional blocks, combined into fewer blocks, or eliminated, depending on the desired implementation. Moreover, the blocks of process 500 may be executed in the order shown in FIG. 5 or, alternatively, in a different order. Process 500 may be implemented by network apparatus 420 or any suitable network device or machine type devices. Solely for illustrative purposes and without limitation, process 500 is described below in the context of communication apparatus 420. Process 500 may begin at block 510.

At 510, process 500 may involve processor 422 of network apparatus 420 transmitting, by transceiver 426, a first set of encoded bits corresponding to a first TB via a first PDSCH to a UE. Process 500 may proceed from 510 to 520.

At 520, process 500 may involve processor 422 generating a second set of encoded bits corresponding to the first TB and a third set of encoded bits corresponding to a second TB. Process 500 may proceed from 520 to 530.

At 530, process 500 may involve processor 422 transmitting, by the transceiver 426, the second set of encoded bits and the third set of encoded bits via a second PDSCH to the UE.

In some implementations, process 500 may further involve processor 422 transmitting, by the transceiver 426, a control information to the UE. The control information indicates to the UE that the first TB and the second TB are carried by the second PDSCH.

FIG. 6 illustrates an example process 600 in accordance with an implementation of the present disclosure. Process 600 may be an example implementation of above scenarios/schemes, whether partially or completely, with respect to improvement of TB retransmission of the present disclosure. Process 600 may represent an aspect of implementation of features of communication apparatus 410. Process 600 may include one or more operations, actions, or functions as illustrated by one or more of blocks 610 to 630. Although illustrated as discrete blocks, various blocks of process 600 may be divided into additional blocks, combined into fewer blocks, or eliminated, depending on the desired implementation. Moreover, the blocks of process 600 may be executed in the order shown in FIG. 6 or, alternatively, in a different order. Process 600 may be implemented by communication apparatus 410 or any suitable UE or machine type devices. Solely for illustrative purposes and without limitation, process 600 is described below in the context of communication apparatus 410. Process 600 may begin at block 610.

At 610, process 600 may involve processor 412 of communication apparatus 410 receiving, by transceiver 416, a first set of encoded bits corresponding to a first TB via a first PDSCH from a network node. Process 600 may proceed from 610 to 620.

At 620, process 600 may involve processor 412 transmitting, by the transceiver 416, a NACK corresponding to the first TB to the network node. Process 600 may proceed from 620 to 630.

At 630, process 600 may involve processor 412 receiving, by the transceiver 416, a second set of encoded bits corresponding to the first TB and a third set of encoded bits corresponding to the second TB via a second PDSCH from the network node.

In some implementations, process 600 may further involve processor 412 receiving, by the transceiver 416, a control information from the network node. The control information indicates to the communication apparatus 410 that the first TB and the second TB are multiplexed in a time-frequency domain or in a spatial domain, within time-frequency resources allocated to the second PDSCH.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

transmitting, by a processor of an apparatus, a first set of encoded bits corresponding to a first transport block (TB) via a first physical downlink share channel (PDSCH) to a user equipment (UE);

generating, by the processor, a second set of encoded bits corresponding to the first TB and a third set of encoded bits corresponding to a second TB; and transmitting, by the processor, the second set of encoded bits and the third set of encoded bits via a second PDSCH to the UE.

2. The method of claim 1, wherein the second set of encoded bits is generated based on the first TB without cyclic redundancy check (CRC) code, and the third set of encoded bits is generated based on the second TB with CRC code derived from the second TB.

3. The method of claim 1, further comprising:

transmitting, by the processor, control information to the UE, wherein the control information indicates to the UE that the first TB and the second TB are carried by the second PDSCH.

4. The method of claim 3, wherein the control information further indicates to the UE that the first TB and the second TB are multiplexed in a time-frequency domain within time-frequency resources allocated to the second PDSCH.

5. The method of claim 3, wherein the control information further indicates to the UE a plurality of first physical resource blocks (PRBs) associated with the first TB and a plurality of second PRBs associated with the second TB.

6. The method of claim 3, wherein the control information further includes a value denoting a number of PRBs allocated to the second TB.

7. The method of claim 3, wherein the control information further indicates a first redundancy version associated with the first TB and a second redundancy version associated with the second TB to generate the first set of encoded bits and the second set of encoded bits.

8. The method of claim 3, wherein the control information further indicates to the UE that the first TB and the second TB are multiplexed in a spatial domain within time-frequency resources allocated to the second PDSCH.

9. The method of claim 3, wherein the control information further indicates to the UE at least one first spatial layer associated with the first TB and at least one second spatial layer associated with the second TB.

10. The method of claim 3, wherein the control information is included in a downlink control information (DCI) or a radio resource control (RRC) message.

11. A method, comprising:

receiving, by a processor of an apparatus, a first set of encoded bits corresponding to a first transport block (TB) via a first physical downlink share channel (PDSCH) from a network node;

transmitting, by the processor, a negative acknowledgment (NACK) corresponding to the first TB to the network node; and receiving, by the processor, a second set of encoded bits corresponding to the first TB and a third set of encoded bits corresponding to the second TB via a second PDSCH from the network node.

12. The method of claim 11, further comprising:

transmitting, by the processor, an indicator indicating a quality gap between a reference quality and a quality of receiving the first PDSCH to the network node.

13. The method of claim 11, further comprising:

receiving, by the processor, control information from the network node, wherein the control information indicates to the apparatus that the first TB and the second TB are multiplexed in a time-frequency domain or in a spatial domain, within time-frequency resources allocated to the second PDSCH.

14. The method of claim 13, wherein the control information further indicates to the apparatus a plurality of first physical resource blocks (PRBs) associated with the first TB and a plurality of second PRBs associated with the second TB.

15. The method of claim 13, wherein the control information further includes a value denoting a number of PRBs allocated to the second TB.

16. The method of claim 13, wherein the control information further indicates to the apparatus a first redundancy version associated with the first TB and a second redundancy version associated with the second TB.

17. The method of claim 13, wherein the control information further indicates to the apparatus at least one first spatial layer associated with the first TB and at least one second spatial layer associated with the second TB.

18. The method of claim 11, wherein the third set of encoded bits are generated according to the second TB transmitted with cyclic redundancy check (CRC) code and the second set of encoded bits are generated according to the first TB transmitted without CRC code.

19. An apparatus, comprising:

a transceiver which, during operation, wirelessly communicates with a user equipment (UE); and a processor communicatively coupled to the transceiver such that, during operation, the processor performs operations comprising:

transmitting, by the transceiver, a first set of encoded bits corresponding to a first transport block (TB) via a first physical downlink share channel (PDSCH) to the UE;

generating a second set of encoded bits corresponding to the first TB and a third set of encoded bits corresponding to a second TB; and transmitting, by the transceiver, the second set of encoded bits and the third set of encoded bits via a second PDSCH to the UE.

20. An apparatus, comprising:

a transceiver which, during operation, wirelessly communicates with a network node; and a processor communicatively coupled to the transceiver such that, during operation, the processor performs operations comprising:

receiving, by the transceiver, a first set of encoded bits corresponding to a first transport block (TB) via a first physical downlink share channel (PDSCH) from the network node;

transmitting, by the transceiver, a negative acknowledgment (NACK) corresponding to the first TB to the network node; and receiving, by the transceiver, a second set of encoded bits corresponding to the first TB and a third set of encoded bits corresponding to the second TB via a second PDSCH from the network node.

* * * * *